United States Patent
Low et al.

(10) Patent No.: US 9,165,393 B1
(45) Date of Patent: Oct. 20, 2015

(54) MEASURING STEREOSCOPIC QUALITY IN A THREE-DIMENSIONAL COMPUTER-GENERATED SCENE

(71) Applicant: DreamWorks Animation LLC, Glendale, CA (US)

(72) Inventors: Matthew Low, Santa Monica, CA (US); Donald Greenberg, Ithaca, NY (US); Philip McNally, Eagle Rock, CA (US)

(73) Assignee: DreamWorks Animation LLC, Glendale, CA (US)

( * ) Notice: Subject to any disclaimer, the term of this patent is extended or adjusted under 35 U.S.C. 154(b) by 407 days.

(21) Appl. No.: 13/831,453

(22) Filed: Mar. 14, 2013

Related U.S. Application Data

(63) Continuation of application No. 13/563,646, filed on Jul. 31, 2012, now abandoned.

(51) Int. Cl.
*G06T 15/00* (2011.01)
*H04N 13/00* (2006.01)
*H04N 13/04* (2006.01)
(Continued)

(52) U.S. Cl.
CPC ............... *G06T 15/00* (2013.01); *G06T 7/002* (2013.01); *H04N 13/0246* (2013.01); *H04N 2013/0074* (2013.01)

(58) Field of Classification Search
CPC ......... G06T 3/00; G06T 7/002; G06T 7/0022; G06T 7/0075; G06T 7/0077; G06T 13/20; G06T 15/00; G06T 15/10; H04N 13/00; H04N 13/0003; H04N 13/0007; H04N 13/0011; H04N 13/0018; H04N 13/0055; H04N 2013/0074; H04N 2013/0081; H04N 13/0203; H04N 13/0246; H04N 13/0275; H04N 13/0282; H04N 19/154; G02B 27/22; G02B 27/2228

USPC .................. 345/419; 348/42, 51; 382/154
See application file for complete search history.

(56) References Cited

U.S. PATENT DOCUMENTS 5,777,621 A * 7/1998 Schneider et al. ............ 345/428
2002/0191837 A1* 12/2002 Takeda et al. ................. 382/154
(Continued)

OTHER PUBLICATIONS

Xing, Liyuan, et al. "Estimating quality of experience on stereoscopic images." Intelligent Signal Processing and Communication Systems (ISPACS), 2010 International Symposium on. IEEE, Dec. 2010.*

(Continued)

*Primary Examiner* — Ulka Chauhan
*Assistant Examiner* — Sae Won Yoon
(74) *Attorney, Agent, or Firm* — Morrison & Foerster LLP

(57) ABSTRACT

A computer-implemented method for measuring the stereoscopic quality of a computer-generated object in a three-dimensional computer-generated scene. The computer-generated object is visible from at least one camera of a pair of cameras used for creating a stereoscopic view of the computer-generated scene. A set of surface vertices of the computer-generated object is obtained. A stereoscopic transformation on the set of surface vertices is computed to obtain a set of transformed vertices. A translation vector and a scale vector are computed and applied to the set of transformed vertices to obtain a ghosted set of vertices. The ghosted set of vertices is approximately translational and scale invariant with respect to the set of surface vertices. A sum of the differences between the set of surface vertices and the set of ghosted vertices is computed to obtain a first stereo-quality metric.

24 Claims, 11 Drawing Sheets

(51) Int. Cl.
*G06K 9/00* (2006.01)
*G06T 7/00* (2006.01)
*H04N 13/02* (2006.01)

(56) References Cited

U.S. PATENT DOCUMENTS

| | | | |
|---|---|---|---|
| 2004/0135744 A1* | 7/2004 | Bimber et al. | 345/32 |
| 2005/0117215 A1* | 6/2005 | Lange | 359/462 |
| 2007/0176914 A1* | 8/2007 | Bae et al. | 345/204 |
| 2008/0018732 A1* | 1/2008 | Moller | 348/51 |
| 2008/0198920 A1* | 8/2008 | Yang et al. | 375/240.01 |
| 2010/0328428 A1* | 12/2010 | Booth et al. | 348/46 |
| 2011/0063421 A1* | 3/2011 | Kubota | 348/52 |
| 2011/0187706 A1* | 8/2011 | Vesely et al. | 345/419 |
| 2011/0292044 A1* | 12/2011 | Kim et al. | 345/419 |
| 2011/0311147 A1* | 12/2011 | Pahalawatta et al. | 382/197 |
| 2012/0013616 A1* | 1/2012 | Uesaki | 345/419 |
| 2012/0044323 A1* | 2/2012 | Chen et al. | 348/43 |
| 2012/0127283 A1* | 5/2012 | Kim | 348/51 |
| 2012/0218391 A1* | 8/2012 | Baker | 348/51 |
| 2012/0218393 A1* | 8/2012 | Fortin et al. | 348/59 |
| 2013/0083002 A1* | 4/2013 | Hwang et al. | 345/419 |
| 2013/0155049 A1* | 6/2013 | Marsan | 345/419 |
| 2013/0169748 A1* | 7/2013 | Corral-Soto | 348/43 |

OTHER PUBLICATIONS

You, Junyong, et al. "Perceptual quality assessment for stereoscopic images based on 2D image quality metrics and disparity analysis." Proc. of International Workshop on Video Processing and Quality Metrics for Consumer Electronics, Scottsdale, AZ, USA. Jan. 2010.*

Shen, Lili, Jiachen Yang, and Zhuoyun Zhang. "Stereo picture quality estimation based on a multiple channel HVS model." Image and Signal Processing, 2009. CISP'09. 2nd International Congress on. IEEE, Oct. 2009.*

Yang, Jiachen, et al. "Objective quality assessment method of stereo images." 3DTV Conference: The True Vision-Capture, Transmission and Display of 3D Video, 2009. IEEE, May 2009.*

Benoit, Alexandre, et al. "Quality assessment of stereoscopic images." EURASIP journal on image and video processing 2008 (Published Jan. 2009): Article-ID.*

Wang, Xu, et al. "Research on subjective stereoscopic image quality assessment." IS&T/SPIE Electronic Imaging. International Society for Optics and Photonics, Jan. 2009.*

Gorley, Paul, and Nick Holliman. "Stereoscopic image quality metrics and compression." Electronic Imaging 2008. International Society for Optics and Photonics, Jan. 2008.*

Boev, Atanas, et al. "Towards compound stereo-video quality metric: a specific encoder-based framework." Image Analysis and Interpretation, 2006 IEEE Southwest Symposium on. IEEE, Mar. 2006.*

* cited by examiner

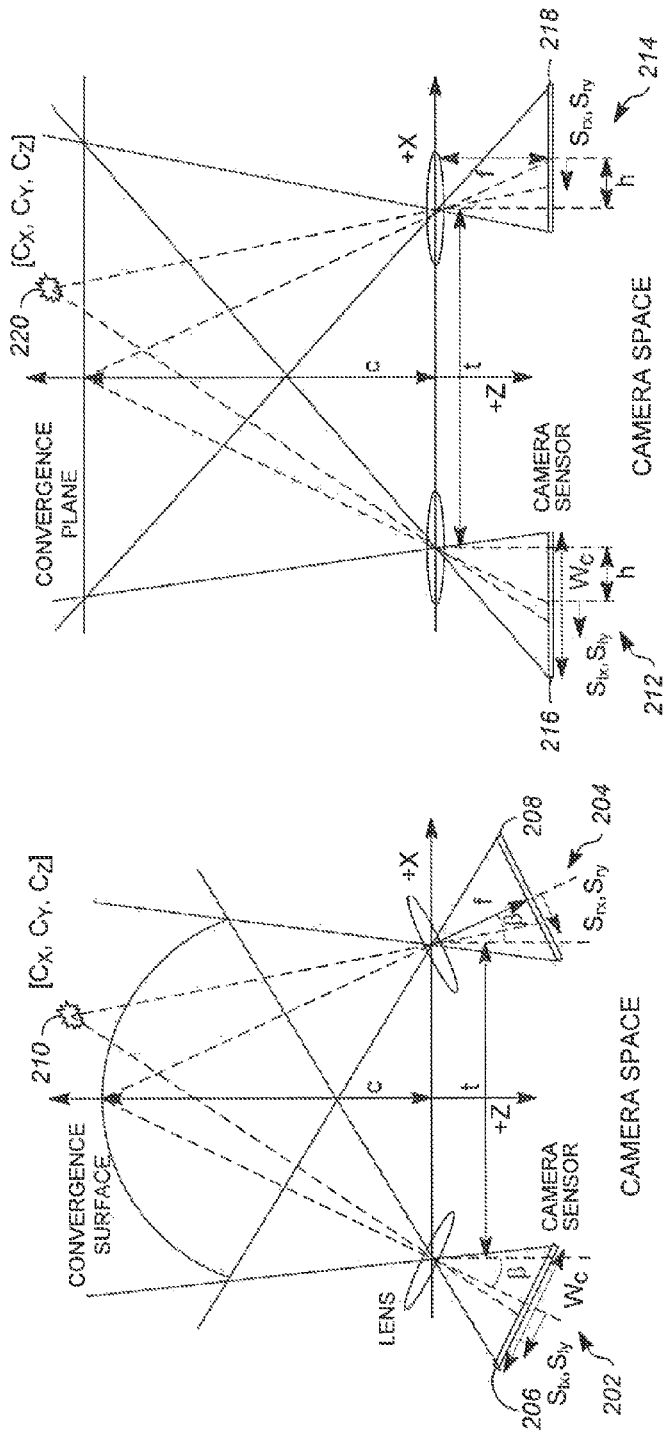

MEASURING STEREOSCOPIC QUALITY IN A THREE-DIMENSIONAL COMPUTER-GENERATED SCENE

BACKGROUND

1. Field

The present disclosure relates generally to measuring stereoscopic quality, and more specifically to determining a quantitative measurement of perceived distortion in a computer-generated object depicted in a stereoscopic computer-generated scene.

2. Related Art

Cinematographic-quality computer animation has evolved to produce increasingly realistic and engaging visual effects. One way that this is accomplished is through the use of stereoscopic filming techniques that simulate human binocular vision by presenting slightly different viewpoints of a scene to a viewer's left and right eye. This technique, also known colloquially as "3D," can be used to enhance the illusion of depth perception and make objects in a computer-generated scene appear to extend outward from a two-dimensional screen.

In normal human binocular vision, each eye views the world from a slightly different perspective. The difference in the view from each eye, also called parallax, is caused, in part, by the spatial separation between the eyes. The brain is able to combine the different views from each eye and use the parallax between views to perceive the relative depth of real-world objects.

Computer animation stereoscopic filming techniques take advantage of the brain's ability to judge depth through parallax by presenting separate images to each eye. Each image depicts a computer-generated object from a slightly different viewpoint. The greater the parallax between the two images, the closer the computer-generated object appears to the viewer.

One drawback to stereoscopic films is that the shape of computer-generated objects may appear distorted to a viewer sitting in a theater. The amount of distortion may depend on the amount of simulated parallax between the images and the viewer's actual distance from the screen. The computer-generated object may appear to be further distorted due to other visual effects, such as camera weighting or other post-production editing techniques.

In the past, the amount of distortion was qualitatively assessed by a human through visual inspection of the stereoscopically filmed scene. In some cases, overly distorted scenes were further manipulated using post-production techniques. In some cases, overly distorted scenes were re-shot using different scene parameters. The modified or new stereoscopically filmed scene would then be visually inspected again and the degree of distortion could be qualitatively assessed as either better or worse.

The techniques described herein quantify the perceived distortion of computer-generated objects in a stereoscopically filmed, computer-generated scene by defining a stereo-quality metric. The quantifiable stereo-quality metric can be used to assess the relative visual quality of a 3D scene and ensure that the viewer-perceived distortions are within acceptable limits.

BRIEF SUMMARY

In one exemplary embodiment the stereoscopic quality of a computer-generated object in a three-dimensional computer-generated scene is determined. The computer-generated object is visible from at least one camera of a pair of cameras used for creating a stereoscopic view of the computer-generated scene. A set of surface vertices of the computer-generated object is obtained. A stereoscopic transformation on the set of surface vertices is computed to obtain a set of transformed vertices. The set of transformed vertices are representative of a stereoscopic shape distortion of the computer-generated object. A translation vector between the set of surface vertices and the set of transformed vertices is computed. A scale factor between the set of surface vertices and the set of transformed vertices is also computed. The translation vector and the scale factor are applied to the set of transformed vertices to obtain a ghosted set of vertices. The ghosted set of vertices is approximately translational and scale invariant with respect to the set of surface vertices. A sum of the differences between the set of surface vertices and the set of ghosted vertices is computed to obtain a first stereo-quality metric. The first stereo-quality metric is stored.

In some exemplary embodiments, the stereo-quality metric is compared to a predetermined threshold value. If the comparison between the stereo-quality metric and the predetermined threshold value meets a predetermined criteria, a stereoscopic view of the computer-generated scene is created and stored.

In some exemplary embodiments, the stereoscopic transformation is based on, in part, a convergence distance, wherein the convergence distance is a distance from the pair of cameras to a point in the computer-generated scene that results in zero parallax. In some exemplary embodiments, the stereoscopic transformation is based on, in part, the position of the pair of cameras with respect to the computer-generated object in the computer-generated scene. The position of the pair of cameras may be defined by: a location of the optical center of the at least one camera of the pair of cameras, and an offset of an optical sensor with respect to the optical center of the at least one camera of the pair of cameras. The position of the pair of cameras may also be defined by: a location of the optical center of the at least one camera of the pair of cameras, and a convergence angle between the pair of cameras.

In some exemplary embodiments, a translational invariance distortion vector is computed by taking the difference between a first centroid of the set of surface vertices and a second centroid of the set of transformed vertices. The translational invariance distortion vector is then used to compute the translation vector.

DESCRIPTION OF THE FIGURES

FIGS. 2A and 2B depict exemplary configurations for stereoscopically filming a computer-generated scene.

DETAILED DESCRIPTION

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments. Thus, the various embodiments are not intended to be limited to the examples described herein and shown, but are to be accorded the scope consistent with the claims.

Figure 1:
FIG. 1 depicts a stereoscopically filmed, computer-generated scene.

FIG. 1 depicts a stereoscopically filmed, computer-generated scene. The scene depicts two animated characters viewed in profile from the side. For purposes of this discussion, each animated character is treated as a single computer-generated object. The image depicted in FIG. 1 is a composite of two views of the computer-generated scene: one view from a left camera and one view from a right camera. The left and right camera views can be used to produce a stereoscopic image of the computer-generated scene. Typically, the cameras used to produce the left and right views are offset a distance that corresponds to an estimated distance between the viewer's eyes (approximately 65 mm).

The image in FIG. 1 appears slightly blurred because the animated characters (exemplary computer-generated objects) are viewed from the slightly different positions of the left and right camera. However, when the image is viewed with appropriate stereoscopic equipment, the left-camera view is presented to the viewer's left eye in isolation and the right-camera view is presented to the viewer's right eye in isolation. This can be achieved using a number of techniques that are known in the art, including, for example, use of stereoscopic glasses. Using these known techniques, the left-camera view is separately presented to the left eye using polarized or color-coded light that corresponds to a polarized or color-coded left lens of the stereoscopic glasses. Similarly, the right-camera view is separately presented to the right eye using polarized or color-coded light that is distinguishable from the left-camera view.

The viewer is able to mentally and visually combine the left-camera and right-camera view into a composite image that includes a certain degree of parallax for one or more computer-generated objects. The greater the parallax, the closer the computer-generated object appears to the viewer. As discussed above, a filmmaker can use this stereoscopic effect to make computer-generated objects appear to have depth even though they are displayed on what is essentially a two-dimensional screen.

1. Filming and Viewing a Stereoscopic Computer-Generated Scene

FIGS. 2A and 2B depict an exemplary optical configuration of a stereoscopically filmed computer-generated scene including a left camera (202, 212) and a right camera (204, 214) viewing a point (210, 220) on an object in a computer-generated scene. FIGS. 2A and 2B depict alternative configurations for positioning the cameras when filming the computer-generated scene. FIG. 2A depicts a converged camera configuration with the cameras 202 and 204 pointed inward at an angle fi and converging along a curved convergence surface. FIG. 2B depicts an alternative configuration with cameras 212 and 214 pointed in a parallel direction and having sensors (216, 218) offset from the center of their respective lens at a distance h. In FIG. 2B, the parallel cameras 212 and 214 converge along a convergence plane. Either of the camera configurations shown in FIG. 2A or 2B can be used to stereoscopically film a computer-generated scene.

With reference to FIG. 2A, the left and right cameras (202, 204) each record a different image of the computer-generated scene, which includes point 210. The left camera 202 records an image of the point 210 at left-image location $(S_{lx}, S_{ly})$ using the left camera sensor 206. Similarly, the right camera 202 records an image of the point 210 at right-image location $(S_{rx}, S_{ry})$ using the right camera sensor 208. The difference between the left-image location $(S_{lx}, S_{ly})$ and the right-image location $(S_{rx}, S_{ry})$ indicates the amount of parallax for point 210. Similarly, with reference to FIG. 2B, the left and right cameras (212, 214) each record a different image of the point 220 at left-image location $(S_{lx}, S_{ly})$ for left sensor 216 and the right-image location $(S_{rx}, S_{ry})$ for right sensor 218.

FIGS. 2A and 2B also depict several scene parameters that have an impact on how computer-generated objects or points in the computer-generated scene will be perceived by the viewer. The three-dimensional scene coordinate $(C_x, C_y, C_z)$ describes the location of the point 210 within the computer-generated scene. Convergence distance c is the distance from the lenses and the convergence surface or convergence plane. The convergence surface/plane corresponds to the location of points that will have zero parallax between the left and right images. Also, points located further away from the convergence surface/plane will have greater parallax than those points that are closer to the convergence surface/plane. The camera separation t represents the distance between optical nodes of the left and right cameras, and may also have an impact on the amount of parallax. The left and right cameras also have sensor width $W_c$ and a focal length f from the sensor to the lens.

Figure 2C:
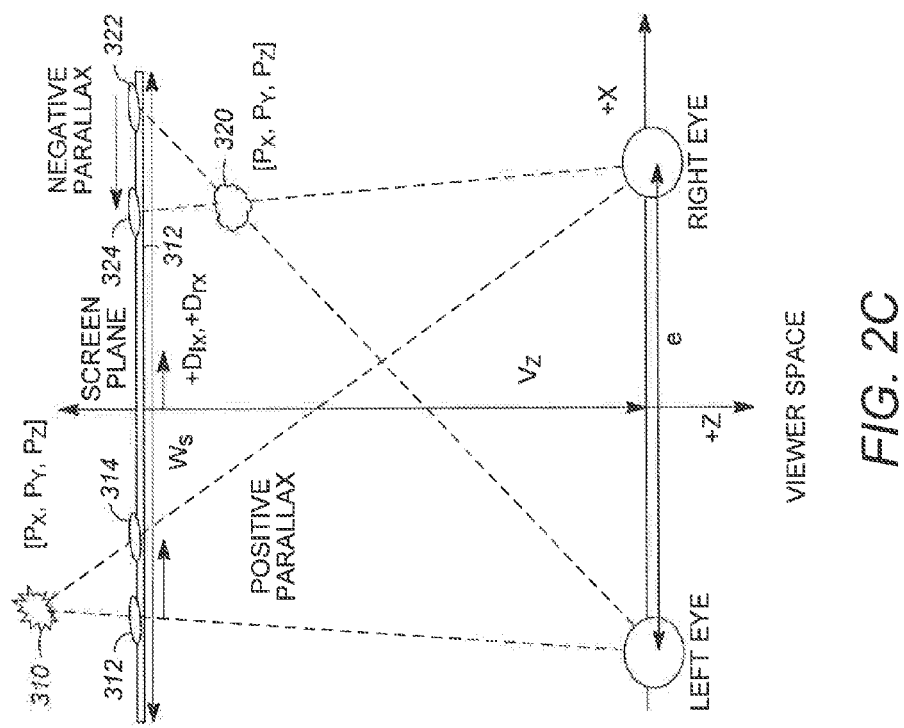
FIG. 2C depicts an exemplary configuration for displaying a stereoscopically filmed scene.

FIG. 2C depicts an exemplary configuration of a stereoscopically filmed computer-generated scene in viewer space. In general, viewer space represents how a stereoscopically filmed, computer-generated scene may be perceived by a modeled viewer located a specified distance from a modeled screen. As shown in FIG. 2C, the modeled viewer has an inter-ocular distance e and is positioned a distance $V_z$ from the modeled screen having a screen width $W_s$. FIG. 2C depicts how left and right views, each presented to the modeled viewer's left and right eye respectively, result in eye convergence that simulate the points as being out of plane from the screen. Specifically, FIG. 2C depicts perceived point 310 that appears to be behind the screen plane, and perceived point 320 that appears to be in front of the screen plane.

Perceived point 310 is represented by left-camera image 312 and right-camera image 314. Because the left-camera image 312 is to the left of right-camera image 314, the perceived point 310 is said to have positive parallax and will appear to the viewer to have a depth that is greater than the distance from the viewer to the screen $V_z$. In other words, to the viewer, the perceived point 310 will appear to exist behind the screen plane.

Similarly, perceived point 320 is represented by left-camera image 322 and right-camera image 324. Because the left-camera image 322 is to the right of right-camera image 324, the perceived point 320 is said to have negative parallax and will appear to the viewer to have a depth that is less than the distance from the viewer to the screen $V_z$. In other words, to the viewer, the perceived point 320 will appear to exist in front of the screen plane.

While perceived points 310 and 320 appear to exist out of plane with the screen, the viewer's eyes are still focused on the displayed images (312, 314, 322, 324) that are a fixed distance away (approximately $V_z$). This creates a disconnection between the viewer's perception about the location of an object and actual distance from the viewer's eye. This disconnection between a viewer's perception and optical reality can lead to distortions in the shape of the objects, as perceived by the user. The following technique quantifies the amount of perceived distortion and determines a stereoscopic quality metric.

2. Determining a Stereoscopic Quality Metric

Figure 3A:
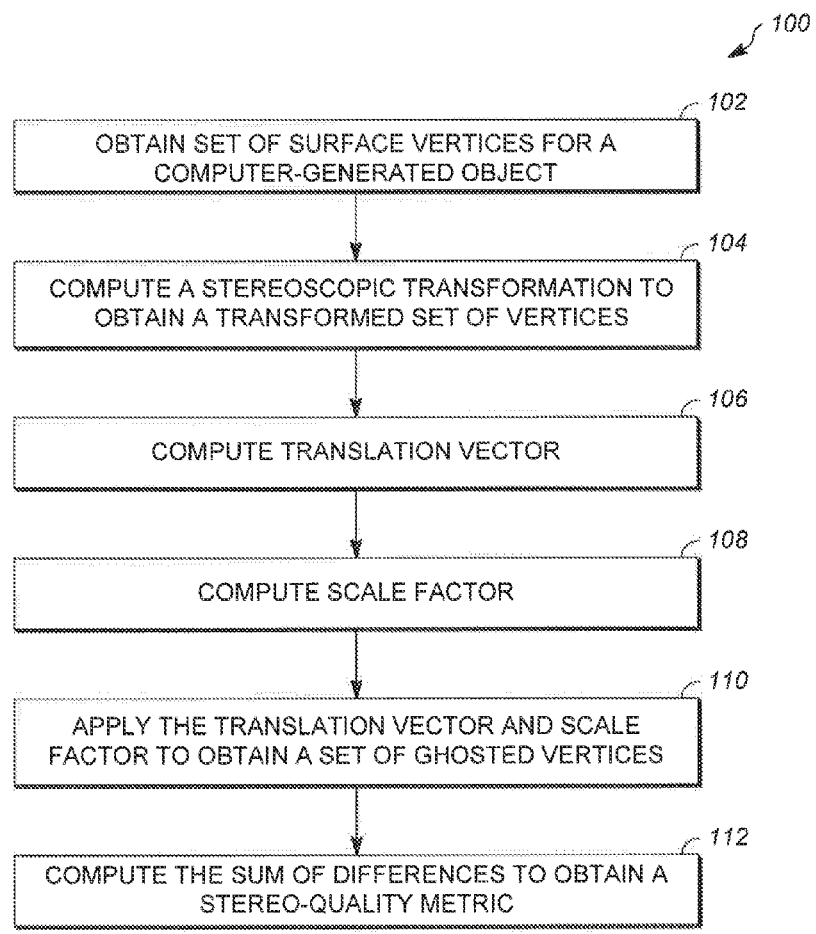
FIGS. 3A and 3B depict exemplary processes for determining a stereoscopic quality metric in a computer-generated scene.
Figure 4:
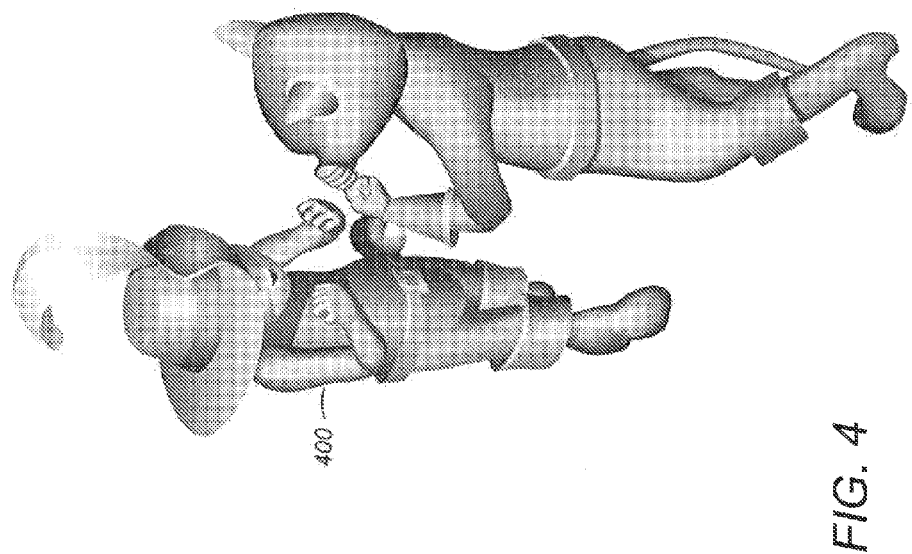
FIG. 4 depicts an animated character in a computer-generated scene.

FIG. 3A depicts a flow chart of an exemplary process 100 for determining a stereoscopic quality metric in a computer-generated scene. The exemplary process 100 can be performed on a computer-generated object on an object-by-object basis in a computer-generated scene. For purposes of this discussion, a computer-generated object is the surface model of the animated character 400 depicted in FIG. 4 (Puss in Boots). One of skill in the art would understand that this technique could also be applied to a portion of a computer-generated object, as well as a composite of multiple computer-generated objects.

In operation 102, a set of surface vertices is obtained for a computer-generated object in a computer-generated scene. In this example, the set of surface vertices is a subset of the vertices used to define the outside surface of the animated character 400 depicted in FIG. 4. In other cases, the set of surface vertices may be derived from the surface geometry of the computer-generated object, but not necessarily used to define the outside surface of the computer-generated object.

In general, the set of surface vertices is representative of the shape of the computer-generated object. Therefore, it is advantageous to use a sufficient number of vertices to represent the overall shape of the computer-generated object. In some cases, it may also be advantageous to limit the number of vertices to a maximum number to maintain a reasonable processing load on the computer system.

The set of surface vertices define the shape and position of the computer-generated object in scene coordinate space. In this example, the set of surface vertices represents the position of the animated character 400 with respect to other computer-generated objects in the computer-generated scene shown in FIG. 4. However, as discussed above, the animated character 400 may be perceived to be distorted in shape when stereoscopically filmed and then viewed on a screen. In most cases, a transformation can be applied to the geometry of the animated character 400 to simulate a viewer's perceived distortions of the animated character 400.

In operation 104, a stereoscopic transformation is computed to obtain a set of transformed vertices. The set of transformed vertices represents the distortion in the shape of the computer-generated object, as perceived by a viewer of the stereoscopically filmed scene. The stereoscopic transformation of operation 104 may be computed using exemplary Equations 1-3, below:

$$P_x = \frac{\left(fe\frac{W_s}{W_c}\right)\left(\tan\left[\arctan\left(\frac{t+2C_x}{2C_z}\right)-\beta\right] - \tan\left[\operatorname{atan}\left(\frac{t-2C_x}{2C_z}\right)-\beta\right]\right)}{2e - 4h\left(\frac{W_s}{W_c}\right) + 2f\left(\frac{W_s}{W_c}\right)} \quad [1]$$

$$\left(\tan\left[\arctan\left(\frac{t-2C_x}{2C_z}\right)-\beta\right] - \tan\left[\arctan\left(\frac{t+2C_x}{2C_z}\right)-\beta\right]\right)$$

$$P_x = \frac{e(S_{ly} + S_{ry})\left(\frac{W_s}{W_c}\right)}{e - 2h\left(\frac{W_s}{W_c}\right) + f\left(\frac{W_s}{W_c}\right)} \quad [2]$$

$$\left(\tan\left[\arctan\left(\frac{t-2C_x}{2C_z}\right)-\beta\right] - \tan\left[\arctan\left(\frac{t+2C_x}{2C_z}\right)-\beta\right]\right)$$

$$P_z = \frac{eV_z}{e - 2h\left(\frac{W_s}{W_c}\right) + f\left(\frac{W_s}{W_c}\right)} \quad [3]$$

$$\left(\tan\left[\arctan\left(\frac{t-2C_x}{2C_z}\right)-\beta\right] - \tan\left[\arctan\left(\frac{t+2C_x}{2C_z}\right)-\beta\right]\right)$$

where: $(P_x, P_y, P_z)$ is the transformed vertex, $(C_x, C_y, C_z)$ is a surface vertex of the computer-generated object in scene coordinate space, $S_{ly}$ is the y-coordinate of the point on the left-camera sensor, $S_{ry}$ is the y-coordinate of the point on the right-camera sensor, $W_c$ is the horizontal width of the camera imaging sensor, $W_s$ is the horizontal width of the display screen, f is the focal length (FIGS. 2A and B), t is the horizontal distance between the optical centers of the left and right cameras, c is the convergence distance, $V_z$ is the viewing distance from the viewer to the screen, β is the convergence angle (FIG. 2A), and h is the camera sensor offset (FIG. 2B). Equations 1-3, above, represent an exemplary stereoscopic transformation that can be performed for operation 104. Other transformation equations may be used, depending on which parameters are used to define the filming and viewing scenarios shown in FIGS. 2A-C.

As shown above, Equations 1-3 can be used to transform a surface vertex $(C_x, C_y, C_z)$ into a transformed vertex $(P_x, P_y, P_z)$. In this example, surface vertex $(C_x, C_y, C_z)$ is one vertex of the set of surface vertices $(C_v)$. To complete stereoscopic transformation of operation 104, each vertex of the set of surface vertices $(C_v)$ is transformed to obtain a corresponding set of transformed vertices $(P_v)$. The set of transformed vertices $(P_v)$ is representative of a stereoscopic shape distortion of the computer-generated object. That is, the set of transformed vertices $(P_v)$ defines a transformed geometry having a shape that represents the shape of the computer-generated object, as perceived by a viewer of a stereoscopically filmed and stereoscopically displayed computer-generated scene.

FIGS. 5A-D depict exemplary transformed geometry representing the perceived distortions of the animated character 400 in a stereoscopically filmed scene. Each of FIGS. 5A-D depict transformed geometry for different filming and/or viewing conditions. The transformed geometry can be computed using a stereoscopic transformation as discussed above with respect to operation 104.

Figure 5A:
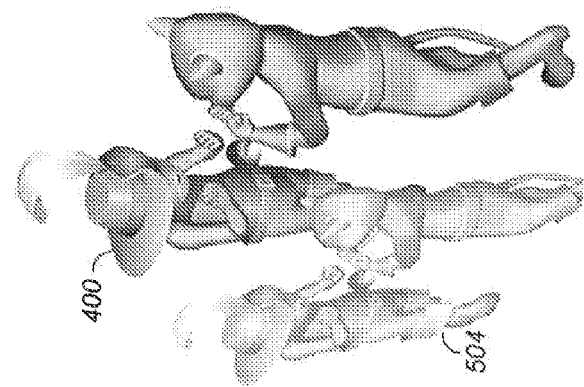
FIGS. 5A-5D depict exemplary transformed geometry with respect to the animated character.

FIG. 5A depicts both the animated character 400 and transformed geometry 502 that represents the stereoscopic shape distortion of the animated character 400, as perceived by the viewer. As shown in FIG. 5A, the transformed geometry 502 appears elongated in shape and deeper in the scene than the animated character 400. This effect may be due, in part, to a distance between the viewer and the screen that is too long.

Figure 5B:
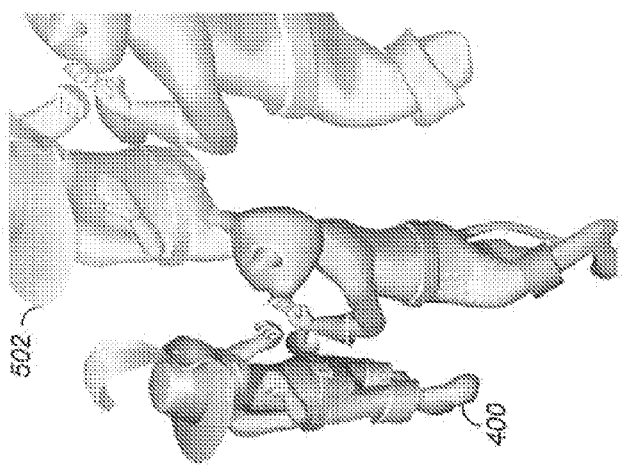

FIG. 5B depicts the animated character 400 and another example of transformed geometry 504 that represents the stereoscopic shape distortion, as perceived by the viewer. As shown in FIG. 5B, the transformed geometry 504 appears flattened in shape and pushed forward in the scene toward the viewer. This effect may be due to a distance between the viewer and the screen that is too short.

Figure 5D:
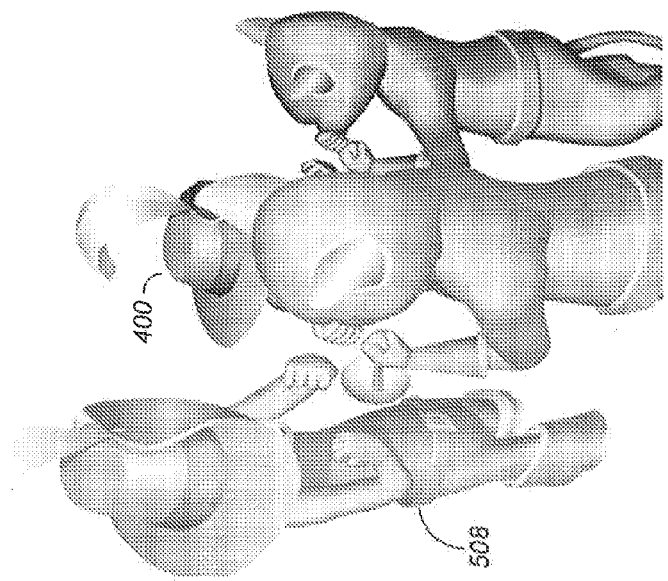
Figure 5C:
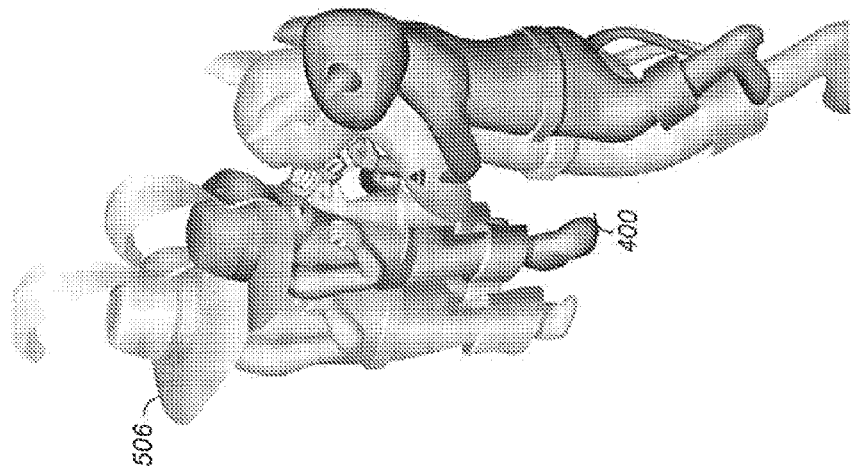

FIG. 5C depicts the animated character 400 and another transformed geometry 506 that represents stereoscopic shape distortion that may be attributable to a focal length that is too long. As shown in FIG. 5C, the transformed geometry appears flattened in shape and is slightly magnified in size. FIG. 5D depicts another transformed geometry 508, which appears enlarged and shifted forward in the scene toward the viewer.

As shown in FIGS. 5A-D, the transformation operation not only changes the shape of the geometry, but may also result in an overall translation and scaling of the geometry with respect to the animated character 400. To perform a direct comparison between the shape of the animated character 400 and the (distorted) shape of the transformed geometry (502, 504, 506, 508), it may be helpful to further manipulate the transformed geometry so that the animated character 400 and transformed geometry occupy approximately the same space in the scene.

In operation 106, a translation vector is computed between the set of surface vertices and the set of transformed vertices. In this example, the translation vector is a translational invariance distortion vector $(D_t)$ and is computed as a difference between the centroid ($\overline{C}$) of the set of surface vertices ($C_v$) and the centroid ($\overline{P}$) of the set and transformed vertices ($P_v$), where:

$$\overline{C} = \frac{\sum_{vertices} C_v}{\|vertices\|}, \quad [4]$$

$$\overline{P} = \frac{\sum_{vertices} P_v}{\|vertices\|}, \text{ and} \quad [5]$$

$$D_t = \overline{C} - \overline{P}. \quad [6]$$

The translational invariance distortion vector ($D_t$) represents the direction and magnitude of the translation required to align the set of surface vertices with the set of transformed vertices.

In operation 108, a scale factor is computed between the set of surface vertices and the set of translated and transformed vertices. In this example, the scale factor is a uniform scale invariance distortion coefficient ($D_s$) and is computed as:

$$D_d = \frac{\sum_{vertices} (\overline{P} - P_v) \cdot (\overline{P} + D_t - C_v)}{\sum_{vertices} \|\overline{P} - P_v\|^2} \quad [7]$$

The scale factor (uniform scale invariance distortion coefficient ($D_s$)) represents the difference in relative scale between the set of surface vertices and the set of transformed vertices.

In operation 110, the translation vector and the scale factor are applied to the set of transformed vertices to obtain a set of ghosted vertices. In this example, the translational invariance distortion vector ($D_t$) and the uniform scale invariance distortion coefficient ($D_s$) are applied to the set of transformed vertices ($P_v$) to obtain a set of ghosted vertices ($G_v$). As a specific example, Equation 8 below depicts an application of the translation vector and scale factor:

$$G_v = D_s(P_v - \overline{P}) + (D_t + \overline{P}). \quad [8]$$

In some cases, after the translation vector and scale factor has been applied to the set of transformed vertices, the resulting set of ghosted vertices ($G_v$) may be nearly translational and scale invariant. That is, the changes to the position and scale of the transformed vertices due to the stereoscopic transformation have little or no effect on the results of a direct spatial comparison between the set of ghosted vertices ($G_v$) and the original set of surface vertices ($C_v$).

Figure 6:
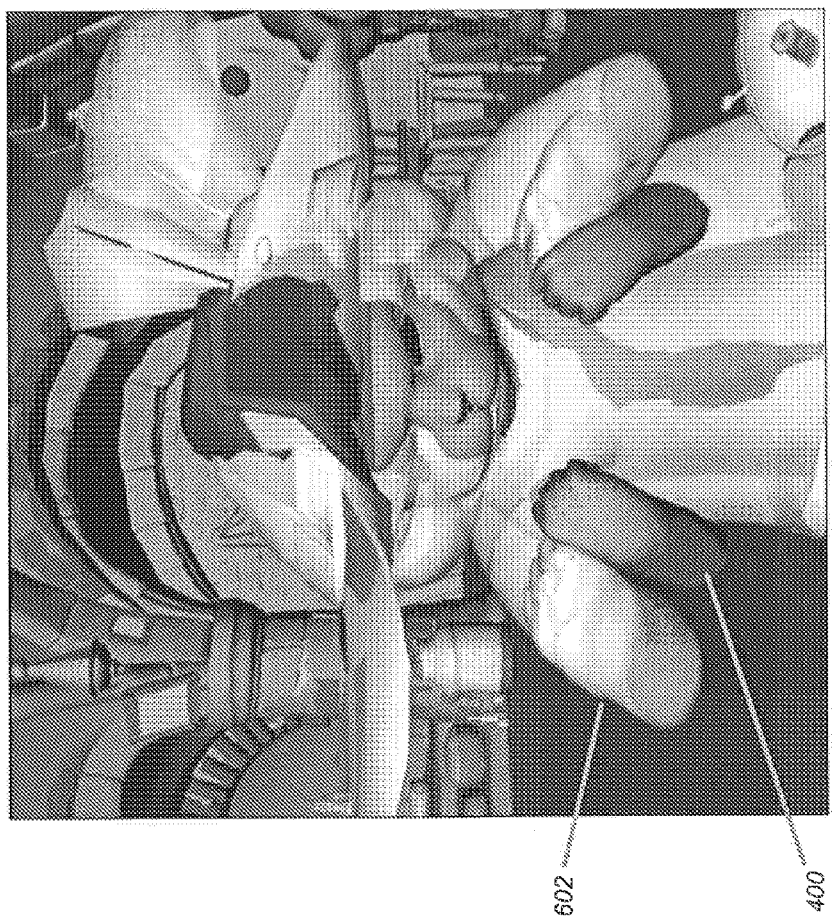
FIG. 6 depicts transformed or ghosted geometry and the animated character.

The set of ghosted vertices ($G_v$) can be used to define ghosted geometry that can be visually compared with the geometry of the computer-generated object (e.g., animated character 400). FIG. 6 depicts an example of the geometry of the animated character 400 and exemplary ghosted geometry 602 displayed in the same image of the computer-generated scene. As shown in FIG. 6, the shape of the ghosted geometry 602 is distorted with respect to the geometry of the animated character 400. Also, because the translation vector and scale factor have been applied, the ghosted geometry 602 is co-located and is the same scale as the animated character 400.

In operation 112, a sum of differences is computed between the set of transformed vertices and the set of surface vertices to obtain a stereo-quality metric. In this example, the stereo-quality metric (M) is computed as:

$$M = \sum_{vertices} \|G_v - C_v\|^2. \quad [9]$$

The stereo-quality metric as calculated using Equation 9 equals the sum of the square of the difference between each vertex in the set of ghosted vertices ($G_v$) and the set of surface vertices ($C_v$). In general, the stereo-quality metric represents the total amount of distortion of the computer-generated object (e.g., animated character) due to stereoscopic filming, as perceived by the user.

Figure 3B:
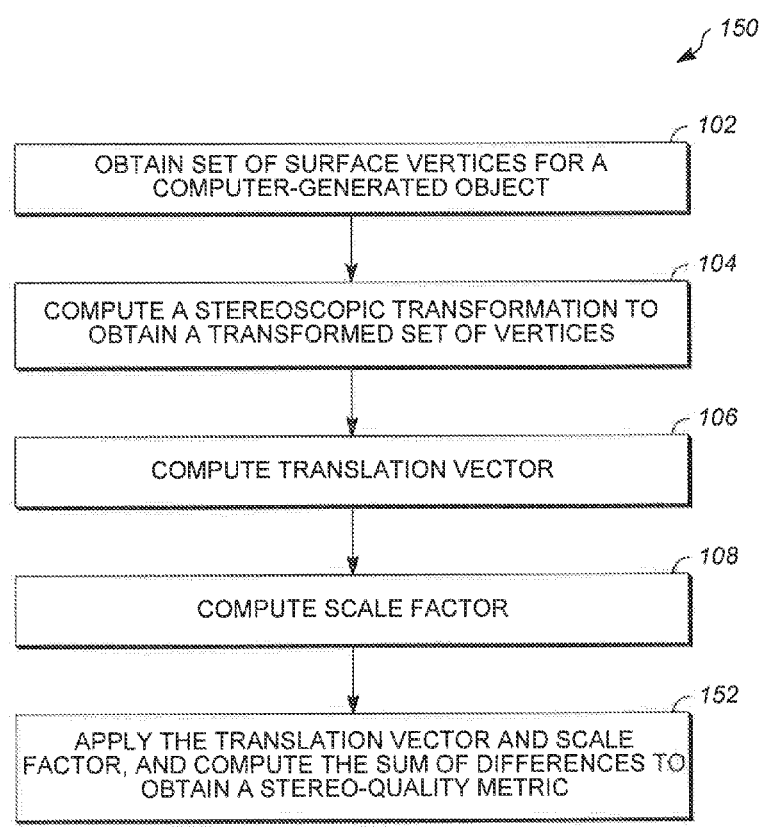

In the alternative, operations 110 and 112 can be combined into a single step. That is, the translation vector and the scale factor can be applied to the set of transformed vertices while computing the sum of differences. An exemplary process 150 is depicted in FIG. 3B and includes combined operation 152. In this alternative embodiment, a set of ghosted vertices may not be explicitly calculated. Equation 10 below depicts an exemplary method of performing operation 152:

$$M = \sum_{vertices} \|D_s(P_v - \overline{P}) + (D_t + \overline{P}) - C_v\|^2. \quad [10]$$

Figure 7:
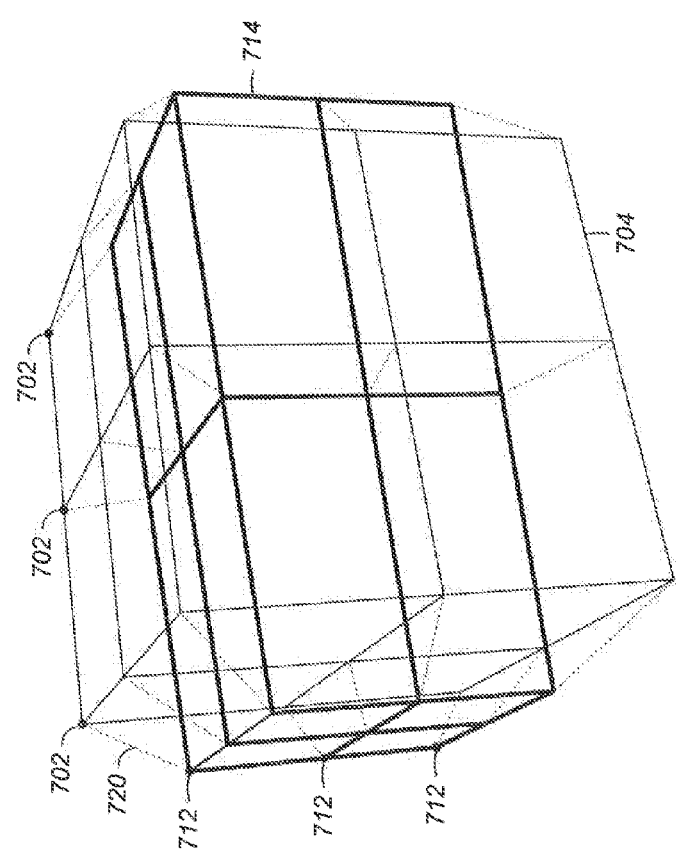
FIG. 7 depicts an exemplary set of surface vertices and an exemplary set of ghosted vertices.

As a simplified visualization of this technique, FIG. 7 depicts an exemplary set of surface vertices 702 that correspond to the geometry of an exemplary computer-generated object, cube 704. FIG. 7 also depicts an exemplary set of ghosted vertices 712 that correspond to exemplary ghosted geometry 714. The shape of ghosted geometry 714 is distorted (e.g., flattened and elongated) with respect to the shape of the cube 704. FIG. 7 also depicts the relative differences 720 between each vertex of the set of surface vertices 702 and the set of ghosted vertices 712. In operation 112, the sum of the relative differences 720 is computed, using, for example, Equation 9.

In operation 114, the stereo-quality metric (M) is stored in non-transitory computer memory. In some cases, the stereo-quality metric (M) can be used to determine the quality of the stereoscopically filmed scene. In some cases, the stereo-quality metric may be compared to a predetermined threshold value. It may be determined that the stereoscopic view of the computer-generated scene includes an acceptable amount of perceived stereoscopic shape distortion based on the comparison between the stereo-quality metric and the predetermined threshold value.

For example, if the stereo-quality metric (M) does not exceed a particular threshold, the level of perceived distortion in the stereoscopically filmed scene may fall within acceptable limits Conversely, if the stereo-quality metric (M) exceeds a particular threshold, the level of perceived distortion may fall outside acceptable limits and the stereoscopically filmed scene may be identified as requiring further review or correction.

The stereo-quality metric (M) may also indicate that one or more parameters of the stereoscopically filmed scene need to be changed, and the scene re-shot. As an example, one or more of the parameters used to compute the stereoscopic transformation (see, Equations 1-3, above) may be changed to produce a stereoscopically filmed scene having a stereo-quality metric (M) that meets a particular threshold. Alternatively or additionally, the stereo-quality metric (M) may indicate that further post-processing of the stereoscopically filmed scene is required to compensate for the level of perceived distortion.

In this exemplary embodiment, the stereoscopic transformation depends on the position of the viewer with respect to the screen. In some cases, it may be beneficial to repeat operations 104-114 for a range of possible positions of a viewer with respect to the display scene.

The exemplary process 100 may also be repeated for multiple computer-generated objects in the scene, resulting in each of the multiple computer-generated objects having an associated stereo-quality metric. In some cases, a composite stereo-quality metric may be computed using each of the respective stereo-quality metrics. For example, the composite stereo-quality metric may be the direct sum or a weighted sum of the respective stereo-quality metrics.

3. Implementation on a Computer Hardware Platform

Figure 8:
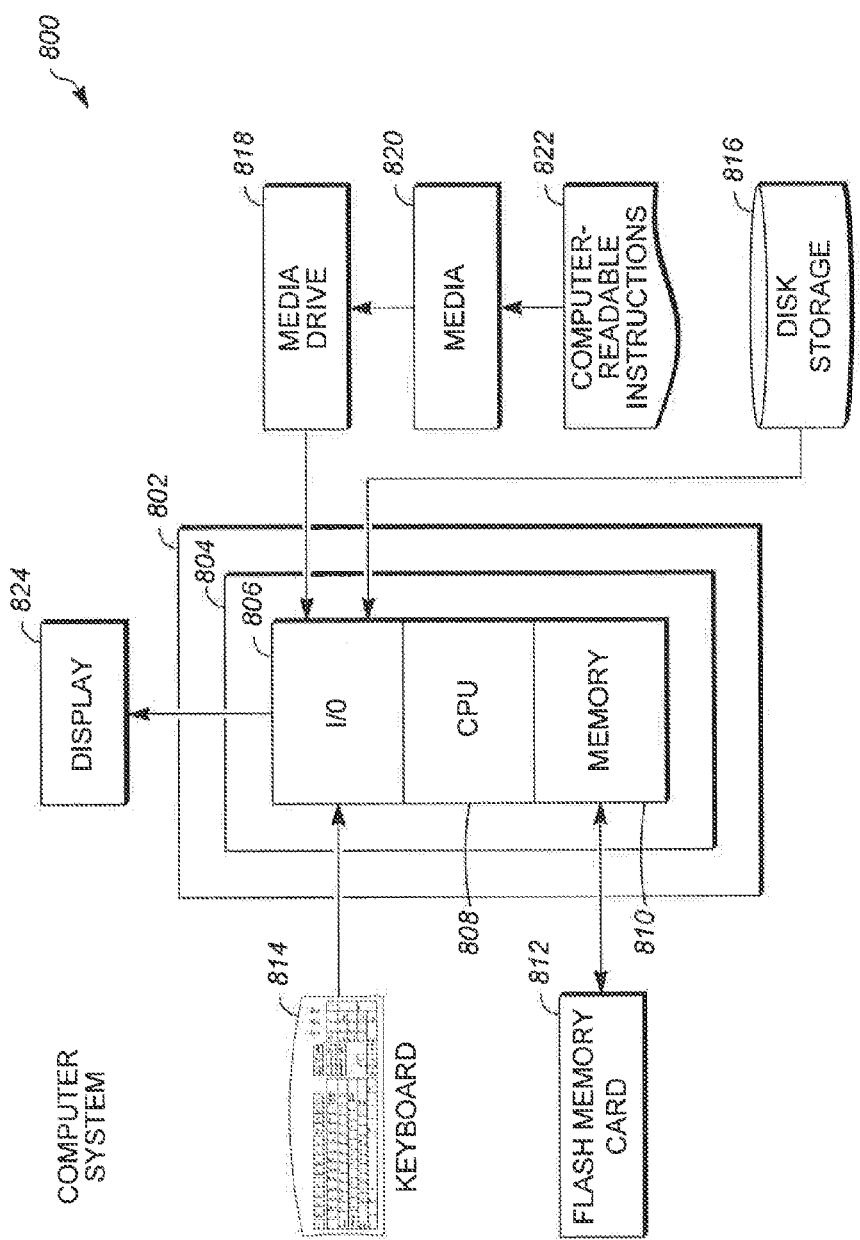
FIG. 8 depicts an exemplary computer system.

The embodiments described herein are typically implemented in the form of computer software (computer-executable instructions) executed on a computer. FIG. 8 depicts an exemplary computer system 800 configured to perform any one of the above-described processes. In this context, computer system 800 may be a general-purpose computer including, for example, a processor, memory, storage, and input/output devices (e.g., monitor, keyboard, disk drive, Internet connection, etc.). However, computer system 800 may include circuitry or other specialized hardware for carrying out some or all aspects of the processes. In some operational settings, computer system 800 may be configured as a system that includes one or more units, each of which is configured to carry out some aspects of the processes either in software, in hardware, or in some combination thereof. For example, in some embodiments, the process for determining the stereoscopic quality of a computer-generated object, as described in FIGS. 3A and 3B, may be computed on parallel computer processors or performed on separate computer systems.

FIG. 8 depicts a computer system 800 with a number of standard components that may be used to perform the above-described processes. The main system 802 includes a motherboard 804 having an input/output ("I/O") section 806, one or more central processing units ("CPU") 808, and a memory section 810, which may have a flash memory card 812 related to it. The I/O section 806 is connected to a display 824, a keyboard 814, a disk storage unit 816, and a media drive unit 818. The media drive unit 818 can read a computer-readable medium 820, which typically contains computer-readable instructions 822 and data.

At least some values based on the results of the above-described processes can be saved for subsequent use. For example, the outputs of the system, including the stereo-quality metric, can be saved directly in memory (e.g, RAM (Random Access Memory)) or an other form of disk storage 816. Additionally, values derived from the stereo-quality metric, such as suggested scene parameters, can also be saved directly in memory.

The above-described processes may be used to generate transformed and ghosted geometry in a three-dimensional computer-generated scene. By rendering a surface model of the geometry, a simulation of stereoscopic distortion can be visualized as a digital image. The image or animation sequence may be stored in memory 810, disk storage 816, or viewed on a computer display 824.

Additionally, a computer-readable medium can be used to store (e.g., tangibly embody) one or more computer programs for performing any one of the above-described processes by means of a computer. The computer program may be written, for example, in a general-purpose programming language (e.g., Pascal, C, C++) or some specialized application-specific language.

Although the invention has been described in considerable detail with reference to certain embodiments thereof, other embodiments are possible, as will be understood to those skilled in the art.

What is claimed is:

1. A computer-implemented method for determining stereoscopic quality of a computer-generated object in a three-dimensional computer-generated scene, the computer-generated object being visible from at least one camera of a pair of cameras used for creating a stereoscopic view of the computer-generated scene, the method comprising:
   obtaining a set of surface vertices of the computer-generated object;
   computing a stereoscopic transformation on the set of surface vertices to obtain a set of transformed vertices, the set of transformed vertices being representative of a stereoscopic shape distortion of the computer-generated object;
   computing a translation vector between the set of surface vertices and the set of transformed vertices;
   computing a scale factor between the set of surface vertices and the set of transformed vertices;
   applying the translation vector and the scale factor to the set of transformed vertices to obtain a ghosted set of vertices, the ghosted set of vertices being approximately translational and scale invariant with respect to the set of surface vertices;
   computing a sum of the differences between the set of surface vertices and the set of ghosted vertices to obtain a first stereo-quality metric; and
   storing the first stereo-quality metric.

2. The computer-implemented method of claim 1, further comprising;
   comparing the stereo-quality metric to a predetermined threshold value; and
   if the comparison between the stereo-quality metric and the predetermined threshold value meets a predetermined criteria, creating and storing the stereoscopic view of the computer-generated scene.

3. The computer-implemented method of claim 1, wherein the stereoscopic transformation is based on, in part, a convergence distance, wherein the convergence distance is a distance from the pair of cameras to a point in the computer-generated scene that results in zero parallax.

4. The computer-implemented method of claim 1, wherein the stereoscopic transformation is based on, in part, the position of the pair of cameras with respect to the computer-generated object in the computer-generated scene.

5. The computer-implemented method of claim 4, wherein the position of the pair of cameras is defined by:
   a location of the optical center of the at least one camera of the pair of cameras; and
   an offset of an optical sensor with respect to the optical center of the at least one camera of the pair of cameras.

6. The computer-implemented method of claim 4, wherein the position of the pair of cameras is defined by:
   a location of the optical center of the at least one camera of the pair of cameras; and
   a convergence angle between the pair of cameras.

7. The computer-implemented method of claim 1, further comprising:
   computing a translational invariance distortion vector by taking the difference between a first centroid of the set of surface vertices and a second centroid of the set of transformed vertices; and
   using the translational invariance distortion vector to compute the translation vector.

8. The computer-implemented method of claim 1, wherein the scale factor represents the relative difference in scale between the set of surface vertices and the set of transformed vertices.

9. The computer-implemented method of claim 1, wherein the set of surface vertices includes vertices that are visible from at least one camera of the pair of cameras used for creating a stereoscopic view of the computer-generated scene.

10. The computer-implemented method of claim 1, further comprising:
    deriving the set of surface vertices from a surface geometry of the computer-generated object.

11. The computer-implemented method of claim 1, further comprising:
    obtaining a second set of surface vertices of a second computer-generated object;
    computing a stereoscopic transformation on the second set of surface vertices to obtain a second set of transformed vertices, the second set of transformed vertices being representative of a stereoscopic shape distortion of the second computer-generated object;
    computing a second translation vector between the second set of surface vertices and the second set of transformed vertices;
    computing a second scale factor between the second set of surface vertices and the second set of transformed vertices;
    applying the second translation vector and the second scale factor to the second set of transformed vertices to obtain a second ghosted set of vertices;
    computing a sum of the differences between the second set of surface vertices and the second set of ghosted vertices to obtain a second stereo-quality metric; and
    storing the second stereo-quality metric.

12. The computer-implemented method of claim 11, further comprising computing a composite stereo-quality metric using the first stereo-quality metric and the second stereo-quality metric.

13. A computer-implemented method for determining stereoscopic quality of a computer-generated object in a three-dimensional computer-generated scene, the computer-generated object being visible from at least one camera of a pair of cameras used for creating a stereoscopic view of the computer-generated scene, the method comprising:
    obtaining a set of surface vertices of the computer-generated object;
    computing a stereoscopic transformation on the set of surface vertices to obtain a set of transformed vertices, the set of transformed vertices being representative of a stereoscopic shape distortion of the computer-generated object;
    computing a translation vector between the set of surface vertices and the set of transformed vertices;
    computing a scale factor between the set of surface vertices and the set of transformed vertices;
    computing a stereo-quality metric by applying the translation vector and the scale factor to the set of transformed vertices and summing the differences between the set of surface vertices and the set of transformed vertices; and
    storing the stereo-quality metric.

14. The computer-implemented method of claim 13, further comprising:
    comparing the stereo-quality metric to a predetermined threshold value;
    determining if the stereoscopic view of the computer-generated scene includes an acceptable amount of perceived stereoscopic shape distortion based on the comparison between the stereo-quality metric and the predetermined threshold value.

15. The computer-implemented method of claim 13, wherein the translation vector is a translational invariance distortion vector that is computed as the difference between a first centroid of the set of surface vertices and a second centroid of the set of transformed vertices.

16. The computer-implemented method of claim 13, wherein the scale factor represents the relative difference in scale between the set of surface vertices and the set of transformed vertices.

17. A non-transitory computer-readable medium including computer-readable instructions that, when executed on a computer processor, cause the computer processor to determine a stereoscopic quality of a computer-generated object in a three-dimensional, computer-generated scene, the computer-generated object being visible from at least one camera of a pair of cameras used for creating a stereoscopic view of the computer-generated scene, the instructions comprising instructions for:
    obtaining a set of surface vertices of the computer-generated object;
    computing a stereoscopic transformation on the set of surface vertices to obtain a set of transformed vertices, the set of transformed vertices being representative of a stereoscopic shape distortion of the computer-generated object;
    computing a translation vector between the set of surface vertices and the set of transformed vertices;
    computing a scale factor between the set of surface vertices and the set of transformed vertices;
    applying the translation vector and the scale factor to the set of transformed vertices to obtain a ghosted set of vertices, the ghosted set of vertices being approximately translational and scale invariant with respect to the set of surface vertices;
    computing a sum of the differences between the set of surface vertices and the set of ghosted vertices to obtain a first stereo-quality metric; and
    storing the first stereo-quality metric.

18. The non-transitory computer-readable instructions of claim 17, the instructions further comprising:
    comparing the stereo-quality metric to a predetermined threshold value; and
    determining if the stereoscopic view of the computer-generated scene includes an acceptable amount of perceived stereoscopic shape distortion based on the comparison between the stereo-quality metric and the predetermined threshold value.

19. The non-transitory computer-readable medium of claim 17, wherein the translation vector is a translational invariance distortion vector that is computed as the difference between a first centroid of the set of surface vertices and a second centroid of the set of transformed vertices.

20. The non-transitory computer-readable medium of claim 17, wherein the scale factor represents the relative difference in scale between the set of surface vertices and the set of transformed vertices.

21. The non-transitory computer-readable medium of claim 17, wherein the stereoscopic transformation is based on, in part, a convergence distance, wherein the convergence distance is a distance from the pair of cameras to a point in the computer-generated scene that results in zero parallax.

22. A computer system for determining stereoscopic quality of a computer-generated object in a three-dimensional computer-generated scene, the computer-generated object being visible from at least one camera of a pair of cameras used for creating a stereoscopic view of the computer-generated scene, the system comprising:
- a memory for storing non-transitory computer-readable instructions;
- a processor for executing the computer-readable instructions, the instructions for:
  - computing a stereoscopic transformation on the set of surface vertices to obtain a set of transformed vertices, the set of transformed vertices being representative of a stereoscopic shape distortion of the computer-generated object;
  - computing a translation vector between the set of surface vertices and the set of transformed vertices;
  - computing a scale factor between the set of surface vertices and the set of transformed vertices;
  - applying the translation vector and the scale factor to the set of transformed vertices to obtain a ghosted set of vertices, the ghosted set of vertices being approximately translational and scale invariant with respect to the set of surface vertices;
  - computing a sum of the differences between the set of surface vertices and the set of ghosted vertices to obtain a first stereo-quality metric; and
  - storing the first stereo-quality metric.

23. The system of claim 22, further comprising:
- comparing the stereo-quality metric to a predetermined threshold value; and
- if the comparison between the stereo-quality metric and the predetermined threshold value meets a predetermined criteria, creating and storing the stereoscopic view of the computer-generated scene.

24. The system of claim 22, further comprising:
- computing a translational invariance distortion vector by taking the difference between a first centroid of the set of surface vertices and a second centroid of the set of transformed vertices; and
- using the translational invariance distortion vector to compute the translation vector.

* * * * *

UNITED STATES PATENT AND TRADEMARK OFFICE
CERTIFICATE OF CORRECTION

PATENT NO. : 9,165,393 B1  
APPLICATION NO. : 13/831453  
DATED : October 20, 2015  
INVENTOR(S) : Matthew Low et al.

Page 1 of 2

It is certified that error appears in the above-identified patent and that said Letters Patent is hereby corrected as shown below:

In the specification,

In column 5, line 53-58, delete "
$$P_x = \frac{e(S_{ty} + S_{ry})\left(\frac{W_s}{W_c}\right)}{e - 2h\left(\frac{W_s}{W_c}\right) + f\left(\frac{W_s}{W_c}\right)} \left(\tan\left[\arctan\left(\frac{t - 2C_x}{2C_z}\right) - \beta\right] - \tan\left[\arctan\left(\frac{t + 2C_x}{2C_z}\right) - \beta\right]\right)$$
" and insert --
$$P_y = \frac{e(S_{ty} + S_{ry})\left(\frac{W_s}{W_c}\right)}{e - 2h\left(\frac{W_s}{W_c}\right) + f\left(\frac{W_s}{W_c}\right)} \left(\tan\left[\arctan\left(\frac{t - 2C_x}{2C_z}\right) - \beta\right] - \tan\left[\arctan\left(\frac{t + 2C_x}{2C_z}\right) - \beta\right]\right)$$
--, therefor.

In column 7, line 6-8, delete "$\overline{C} = \frac{\sum_{vericies} C_v}{\|vertices\|}$" and insert -- $\overline{C} = \frac{\sum_{vertices} C_v}{\|vertices\|}$ --, therefor.

Signed and Sealed this  
Nineteenth Day of July, 2016

Michelle K. Lee  
*Director of the United States Patent and Trademark Office*

In column 7, line 9-11, delete "$\overline{P} = \dfrac{\sum\limits_{vertices} P_v}{\|vertices\|},$" and insert -- $\overline{P} = \dfrac{\sum\limits_{vertices} P_v}{\|vertices\|},$ --, therefor.

In column 7, line 26-29, delete "$D_d = \dfrac{\sum\limits_{vertices} (\overline{P} - P_v) \cdot (\overline{P} + D_t - C_v)}{\sum\limits_{vertices} \|\overline{P} - P_v\|^2}$" and insert -- $D_s = \dfrac{\sum\limits_{vertices} (\overline{P} - P_v) \cdot (\overline{P} + D_t - C_v)}{\sum\limits_{vertices} \|\overline{P} - P_v\|^2}$ --, therefor.

In column 8, line 52, delete "limits" and insert -- limits. --, therefor.